Aug. 20, 1968      E. J. BENSON      3,398,001
PROCESS OF PREPARING AND PACKAGING FROZEN AVOCADOS
Filed April 26, 1963
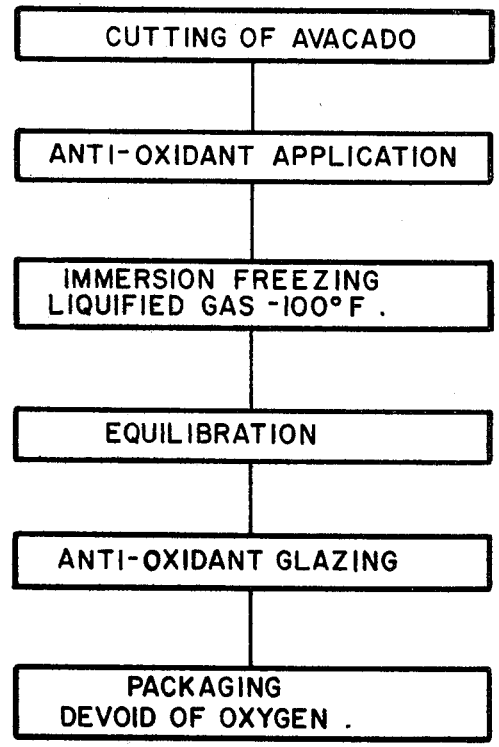
INVENTOR.
ERNEST J. BENSON
BY
AGENT

United States Patent Office 3,398,001
Patented Aug. 20, 1968

3,398,001
PROCESS OF PREPARING AND PACKAGING
FROZEN AVOCADOS
Ernest J. Benson, Madison, Wis., assignor to Air Reduction Company, Incorporated, New York, N.Y., a corporation of New York
Filed Apr. 26, 1963, Ser. No. 275,977
5 Claims. (Cl. 99—193)

This invention relates to the preparation of avocados for storage in frozen condition.

The use of freezing for the storage of avocados has not been practical because of the discoloration of the avocados and also because of cracking or splitting when avocados are subjected to a very low temperature. The discoloration, which is usually a browning of the fruit, at spots and also over substantial areas, sometimes occurs during the freezing; but more often it is a deterioration during storage of the frozen avocados or upon subsequent defrosting preparatory to use.

It is an object of this invention to provide an improved method for preparing avocados for storage in a frozen condition, and to provide a method by which the avocados can be stored for a long period of time.

The drawing is a flow diagram illustrating the steps of the process of this invention and their preferred order. Not all of the steps are necessary for avocados that are to be stored for relatively short periods of time, all of them are used where maximum keeping qualities for the avocados are desired.

The avocados with which this invention is used should be selected on the basis of maturity. The variety of the avocado does not seem to affect the process in any substantial degree; but size does make a difference, and when preparing a quantity of the fruit for storage it is preferable to have all of the fruit of substantially the same size.

Since there is no known method for determining the maturity of an avocado without physical destruction of the fruit, maturity cannot be pin-pointed. The avocado should be just on the immature side of the condition generally referred to as "eating ripe." At this stage of the maturity the fruit is free of brown spots.

The avocados are cut either in half or in slices. Preferably the fruit is cut in half along its longitudinal axis and the seed is removed. The open half is inspected for spots or areas of discoloration and for any soft or rotten places. If any are present, the food is set aside for use as slices or pieces. When avocados are to be packaged as halves, the skin is not removed.

The avocado half is then treated by coating it with an anti-oxidant. The surface is coated by an anti-oxidant, preferably by dipping in a liquid anti-oxidant or in a solution containing an anti-oxidant. A 0.5% ascorbic acid can be used, of half-strength lemon juice, or a solution of citric acid. Other anti-oxidants, such as calcium bisulphate can be used, but the one chosen must be a substance that does not impair the taste, smell or other qualities of the treated fruit.

The length of the anti-oxidant dip is not critical, nor is the strength of the solution. The effect is to prevent browning of the fruit, before or during freezing, and particularly during long storage and upon thawing.

A one-minute dip in 0.5% ascorbic acid or in lemon juice has been found satisfactory. These examples are given merely by way of illustration. The anti-oxidant can be used cold to supply some preliminary refrigeration, if desired.

After treatment with the anti-oxidant, the avocado halves are frozen quickly by immersion in a liquefied gas. Liquid nitrogen or liquid nitrous oxide can be used. The former boils at about —320° F., and the latter at about —127° F. Other low boiling, liquefied gases can be used, but the above examples are relatively inexpensive and are readily available commercially. A quick freezing at a rate that avoids break-down of the cell structure, the immersion freezing should be done in a liquefied gas having a temperature at least as low as —100° F.

Mere light spraying of the avocado half with liquefied gas is not sufficient to freeze the half quickly enough. However, a spraying application can be used when it is suffiicent to freeze the fruit quickly enough to prevent damage to the cellular structure, and such techniques are to be considered "immersion" for purposes of this invention.

The time of immersion depends upon a number of variables, such as initial temperature of the avocado, the maturity, and to some extent the variety, but most of all upon the size of the avocado half. An avocado half cannot be frozen all the way through by immersion in a liquefied gas at —100° F. or lower without splitting or cracking. It is necessary, therefore, to freeze avocado halves part way through and then remove them from the liquefied gas before the fruit cracks or splits. This does not ordinarily build up enough refrigeration in the frozen portion to freeze the inner unfrozen part by conduction if the avocado half is merely withdrawn from the liquefied gas and allowed to stand at room temperature. After withdrawal from the liquefied gas, the avocado half is placed in a cold environment below the freezing temperature of the avocado and preferably as low as 0° F.

The actual immersion time in the liquefied gas varies from about 15 to 50 seconds, the longer time being for a larger size avocado, before the fruit will crack. These values are given by way of illustration.

The avocado half is kept in the cold environment until it freezes solid all the way through. The process is carried out more quickly by doing as much of the freezing as is safe from cracking and splitting in the liquefied gas, and in any event a substantial part of the freezing must be done in the liquefied gas or the subsequent freezing becomes too slow to prevent cellular damage. The avocado half freezes from the outside toward the interior, of course, and if the outside is not frozen to sufficient depth, the subsequent freezing is too slow. At least about 35% to 45% of the mass of the avocado half should be frozen by immersion freezing. The remainder can be frozen by withdrawing of the avocado half from the liquefied gas and leaving it in an environment not higher than about 28° F., and preferably at about 0° F., as previously explained.

While the inner portion freezes at a slower rate than was the case for the outer portion which was frozen by submersion of the liquefied gas, the slower freezing of the inner part of the avocado half does not do any noticeable damage to the cell structure. This may be because of the hard frozen mantle around the interior when 35% to 45% of the mass has been frozen by the immersion in the liquefied gas.

For maximum keeping qualities, the frozen avocado half is glazed after freezing. The purpose of the glaze is to keep the fruit from having contact with oxygen that may be present in the package in which the avocado half is stored. The glaze may be applied by spraying, but is preferably applied by dipping the frozen avocado half in the material with which the avocado is to be glazed. The low temperature of the avocado half causes the glazed material to freeze on the surface of the avocado, and the longer the avocado half is left in the glazing material, the thicker the glaze becomes. The avocado must, of course be at a lower temperature than the freezing temperature of the glaze material.

Pure water can be used for the glaze, but the avocado half has better keeping qualities if glazed with an anti-oxidant, such as lemon juice, or the other anti-oxidants that are used for the initial coating of the avocado before freezing. The glaze is applied over the entire surface of the avovado half. The temperature of the avocado is one variable in determining the time required for glazing. Another consideration is the temperature of the glazing solution. It is advantageous to have the glazing solution as near as possible to its freezing temperature before the avocado half is dipped into it; and to use a short dip. This has the advantage of raising the temperature of the avocado halves as little as possible.

The accumulation of glaze should be allowed to continue until the entire surface of the avocado, including the skin, is coated to form a barrier to contact of the fruit with any oxygen in the surrounding atmosphere, particularly the atmosphere of the package in which the avocado half is placed. Excessively thick glazing is wasteful of time and material, and leaves an unnecessary accumulation of liquid when the avocado is defrosted. For example a dip of 1.5 seconds in half-strength lemon juice at 30° F. gives a satisfactory glaze on an avocado half of average size and which is at a temperature of about 0° F.

After glazing, the avocado half is packaged in an atmosphere substantially devoid of oxygen. In practice there is some oxygen present in the package, but it should be kept below 2% for best results.

Vacuum packaging can be used, but packaging with a nitrogen atmosphere is preferred. Higher concentrations of oxygen in the package can be tolerated when the avocado half is glazed, but having the package substantially devoid of oxygen has the advantage of protecting the avocado half in the event that the package is allowed to thaw sometime before it is opened for use. The package is preferably stored under ordinary frozen food refrigeration and kept below freezing at all times.

When the avocado half is not of acceptable quality throughout, it may be cut into slices and the good parts of the fruit are used for packaging. The halves may be sliced transversely of their length and to form slices of from ¼" to ⅜" in thickness. The skin is removed after slicing. For some purposes, the avocados that are of good quality throughout are sliced and the advantage of using slices of this thickness is that they can be frozen solid by immersion in liquified gases without cracking. If thicker slices are to be used, they ordinarily require removal from the liquified gas before being frozen all the way through as in the case of avocado halves.

When freezing avocado slices, the slices are coated with an anti-oxidant as in the case of avocado halves and they are frozen by immersion in the same kind of liquified gas. As an example of the immersion time, slices may be in liquified gas for from 10 to 40 seconds. The frozen slices are glazed when maximum keeping properties are desired; and are vacuum packed, or packed with nitrogen or other atmosphere substantially devoid of oxygen, and they are stored as frozen food, as in the case of the avocado halves.

The preferred embodiments of the invention have been described but changes and modifications can be made and some features can be used in different combinations without departing from the invention as defined in the claims.

What is claimed is:

1. The method of packaging an avocado which comprises cutting the avocado and removing the seed, dipping the avocado for approximately one minute in an anti-oxidant from the group consisting of .5% ascorbic acid, one-half strength lemon juice, and citric acid, immersing the avocado in a liquified gas from the group consisting of nitrous oxide and nitrogen for a period of between about 15 to 50 seconds, removing the avocado from the liquified gas before the avocado is frozen for its full thickness, completing the freezing of the avocado by equilibrating in an environment having a temperature of between about 0–28° F., glazing the entire surface of the avocado by dipping it for about 1½ seconds in an anti-oxidant from the same group as the original dipping and with the anti-oxidant at a temperature of about 30° F., and packaging the glazed avocado in a container having a nitrogen atmosphere with an oxygen content less than about 2%.

2. The process of preparing and packaging avocado pieces for storage wherein maximum keeping qualities for the avocado pieces are desired, which comprises, cutting the avocado into pieces and removing the seed, coating the surfaces of the avocado pieces with an antioxidant compatible with the desired taste and odor of the avocado pieces, freezing the avocado pieces with at least 35–45% of the freezing done by contacting the avocado pieces with liquified gas having a temperature at least as low as −100° F., removing the avocado pieces from contact with the liquified gas before they freeze to a cracking and splitting condition, and while the inner portion of the avocado pieces are still unfrozen, completing the freezing of the avocado pieces by placing them in an environment having a temperature at least as low as 28° F., applying a glaze over the surface of the avocado pieces after they have been frozen to form a material that protects the avocado pieces from contact with oxygen, and thereafter packaging the avocado pieces in a package having an atmosphere substantially devoid of oxygen.

3. The process of preparing and packaging avocado pieces for storage wherein the storage period may be relatively short, which comprises, cutting the avocado into pieces and removing the seed, coating the surface of the pieces with an antioxidant compatible with the desired taste and odor of the avocado pieces, then freezing the avocado pieces with at least 35–45% of the freezing done by contacting the avocado pieces with liquified gas having a temperature at least as low as −100° F., removing the avocado pieces from contact with the liquified gas before they freeze to a cracking and splitting condition and while the inner portion of the avocado pieces are still unfrozen, completing the freezing of the avocado pieces by placing the avocado pieces in an environment having a temperature at least as low as 28° F., and thereafter packaging the avocado pieces.

4. The process described in claim 2 characterized by removing the skin from the pieces before treating with an antioxidant and before the freezing step.

5. The process described in claim 3 characterized by removing the skin from the pieces before treating with an antioxidant and before the freezing step.

References Cited

UNITED STATES PATENTS

| 1,924,059 | 8/1933 | Hoskins | 99—189 X |
| 2,385,140 | 9/1945 | Knowles | 99—193 X |
| 2,542,068 | 2/1951 | Young et al. | 99—193 X |
| 3,039,276 | 6/1962 | Morrison | 62—64 |
| 3,250,630 | 5/1966 | Webster et al. | 99—192 X |
| 3,297,454 | 1/1967 | Webster et al. | 99—193 X |

OTHER REFERENCES

Strachan et al.: "Ascorbic, Citric and Dihydroxymaleic Acids as Antioxidants in Frozen Pack Fruits," Food Technology, October 1949 pp. 327 to 331.

HYMAN LORD, *Primary Examiner.*